(12) United States Patent
Harm

(10) Patent No.: US 7,228,705 B2
(45) Date of Patent: Jun. 12, 2007

(54) AIR-CONDITIONING INSTALLATION, ESPECIALLY FOR MOTOR VEHICLES

(75) Inventor: Klaus Harm, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/539,232

(22) PCT Filed: Nov. 8, 2003

(86) PCT No.: PCT/EP03/12487

§ 371 (c)(1),
(2), (4) Date: Jan. 8, 2006

(87) PCT Pub. No.: WO2004/054827

PCT Pub. Date: Jul. 1, 2004

(65) Prior Publication Data

US 2006/0168991 A1    Aug. 3, 2006

(30) Foreign Application Priority Data

Dec. 16, 2002 (DE) ............................. 102 58 618

(51) Int. Cl.
*F25D 17/02* (2006.01)
(52) U.S. Cl. .......................................... 62/434; 62/244
(58) Field of Classification Search ................ 62/239, 62/244, 335, 434, 435
See application file for complete search history.

(56) References Cited

U.S. PATENT DOCUMENTS 2,185,022 A    12/1939  Candor 6,314,747 B1 *  11/2001  Wightman ................. 62/196.4
6,474,081 B1 *  11/2002  Feuerecker ...................... 62/99
6,722,147 B2 *   4/2004  Heyl et al. ...................... 62/244

FOREIGN PATENT DOCUMENTS

| DE | 37 04 182 A1  | 8/1988 |
| DE | 195 30 609 A1 | 2/1997 |
| DE | 101 56 944 A1 | 7/2002 |
| DE | 101 40 630 A1 | 2/2003 |
| DE | 103 08 542 A1 | 9/2003 |

* cited by examiner

*Primary Examiner*—Melvin Jones
(74) *Attorney, Agent, or Firm*—Akerman Senterfitt; Stephan A. Pendorf; Yonghong Chen

(57) ABSTRACT

The invention relates to an air-conditioning installation, in particular for motor vehicles, having a compression refrigeration circuit of a refrigerant for A/C operation with a high-pressure region, a suction region and a connected stationary air-conditioning circuit, in particular for stationary air-conditioning operation when the compression refrigeration circuit is switched off, having a compressor, an expansion valve, an evaporator as cooler for releasing refrigeration to the environment, and a thermal accumulator comprising a heat storage medium. The thermal accumulator serves as a refrigeration accumulator and as a condenser during stationary air-conditioning operation. The refrigerant which is present serves as heat transfer medium for transferring the refrigeration from the thermal accumulator to the evaporator in the stationary air-conditioning circuit. The evaporator and the thermal accumulator are connected in series in terms of the flow of refrigerant.

16 Claims, 9 Drawing Sheets

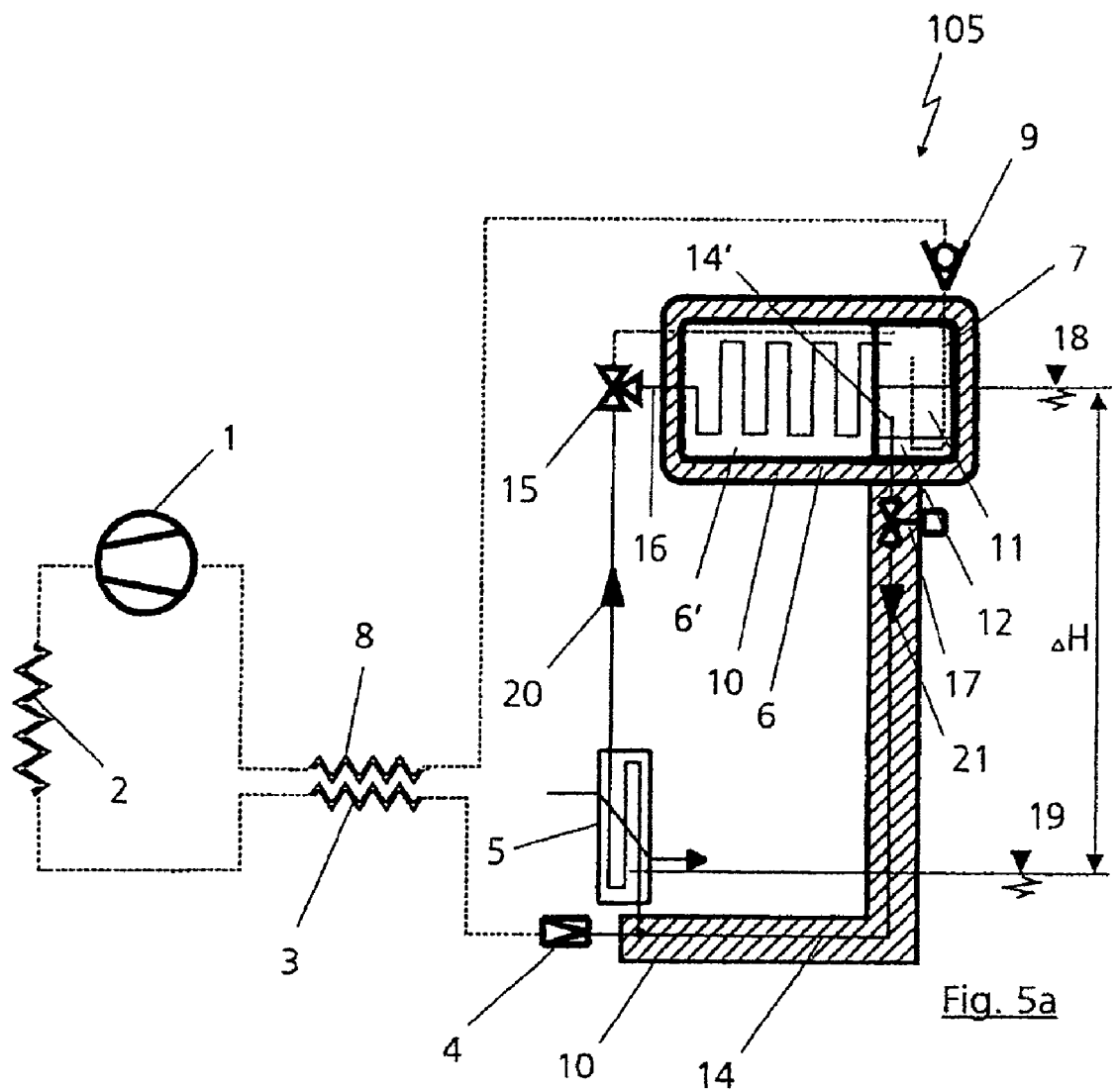

AIR-CONDITIONING INSTALLATION, ESPECIALLY FOR MOTOR VEHICLES

CROSS REFERENCE TO RELATED APPLICATION

This application is a national stage of PCT/EP2003/012487 filed Nov. 8, 2003 and based upon DE 102 58 618.7 filed Dec. 16, 2002 under the International Convention.

BACKGROUND OF THE INVENTION

1. Field of the Invention

The invention relates to an air-conditioning installation, in particular for motor vehicles.

2. Related Art of the Invention

An air-conditioning installation of the generic type is known from DE 37 04 182 A1. In that installation, a cooling installation is operated in combination with a refrigeration accumulator, with the refrigerant being used as heat-transfer medium to transfer the refrigeration from the refrigeration accumulator to the evaporator with the aid of a circulation pump. Evaporator and refrigeration accumulator are connected in parallel on the refrigerant side, which leads to high levels of outlay on connections and components and therefore disadvantageously to high manufacturing costs. Furthermore, an installation of this type of course also takes up valuable space in a motor vehicle, in particular in a passenger automobile.

Conventional refrigeration systems in vehicles are generally driven by a refrigerant compressor only, which is fixedly connected to the vehicle engine via a belt drive. If the engine is not operating, neither is the air-conditioning installation. The passenger compartment can heat up very quickly in summer. The consequence of this is that drivers leave the engine running even in traffic jams or during periods of waiting, in order to keep the air-conditioning installation operating. This is a practice which is a considerable burden on the environment, on account of pollutant and noise emissions, and in addition consumes fuel.

In the case of vehicles with a start/stop function, the engine is automatically switched off as soon as the vehicle is stationary (even in the event of relatively short stops, for example at a red traffic light), in order to reduce fuel consumption. Consequently, the refrigeration installation likewise stops, and consequently it is impossible for functions which are of relevance to safety and comfort, such as cooling and drying of the incoming air for the passenger compartment, to be performed.

Stationary air-conditioning systems have already entered series production in the field of commercial vehicles. This is a standard which is far from being reached in the air-conditioning of passenger automobiles. The current concepts are as yet unsuitable for use in passenger automobiles, on account of the ratios of performance to space and weight.

Stationary air-conditioning concepts with generally indirectly loaded storage evaporators, which have poor cooling dynamics and only effect cooling immediately after the engine has stopped, are known in practical applications.

Furthermore, electrically driven compressors are known, for example in combination with belt-driven starter generator, integrated starter generator or as a hybrid compressor, i.e. as a compressor with integrated electric motor. However, this disadvantageously requires larger batteries and generators. The vehicle then has a high energy consumption when it is stationary. Moreover, the efficiency is very poor on account of the very long chain of action (generator/battery/refrigerant compressor).

Refrigeration installations with a secondary coolant circuit and a thermal accumulator in the secondary circuit using the refrigerants R744/$CO_2$ are likewise known. One drawback in this context is the relatively high outlay on hardware, space and weight. In addition, only limited, low thermodynamics can be realized. Moreover, the efficiency is poor on account of the heat transfer from the refrigerant to the heat-transfer medium and from the heat-transfer medium to the useful air.

Engine-independent air-conditioning systems for long-haul commercial vehicles are also known. In this case, a thermal accumulator is loaded with refrigeration via a secondary circuit, with the associated drawbacks which have been mentioned above (hardware, space and weight), which means that this type of stationary air-conditioning is also somewhat unsuitable for use in passenger automobiles.

SUMMARY OF THE INVENTION

Therefore, the present invention is based on the object of providing an air-conditioning system of the type described in the introduction which resolves the drawbacks of the prior art, and in particular of providing a stationary air-conditioning function with cooling and dehumidification of the useful air which involves little outlay in terms of space, components, connections and electrical energy, in particular for use in passenger automobiles, with good cooling dynamics being achieved in addition.

The measures according to the invention create, in a simple and advantageous way, an air-conditioning installation with stationary air-conditioning function when the compression refrigeration circuit is switched off and in which the outlay in terms of connections and components is very low, on account of the structurally simple series arrangement of evaporator and thermal accumulator on the refrigerant side or in the refrigerant circuit. Accordingly, an air-conditioning function can be realized while the vehicle engine is not operating with little packaging and hardware outlay. Furthermore, the air-conditioning installation according to the invention is also suitable for advance and stationary air conditioning. Better cooling dynamics when the vehicle has heated up and optionally a lower high-temperature peak when the refrigeration installation is being started up with the thermal accumulator loaded are also provided. Furthermore, there is no need for an additional cooling circuit (secondary cooling circuit), which avoids additional outlay on space, components and electrical energy. The circuit connection according to the invention, which substantially comprises a modified refrigeration installation with an integrated thermal accumulator, allows very good air-conditioning to be achieved even when the refrigeration installation is switched off. Refrigerant which is present in the refrigerant collector serves as heat-transfer medium for transferring the refrigeration from the thermal accumulator to the evaporator. Since the refrigerant transfers the energy latently and the evaporation and condensation take place at virtually the same pressure level, only a very low pump power is required to maintain the stationary air-conditioning circuit. Advance air conditioning of the vehicle can be provided even after the engine has been inoperative for a lengthy period of time, by means of optional thermal insulation of the thermal accumulator and the refrigerant collector.

The invention is particularly suitable for refrigeration installations in which the refrigerant collector is located in the suction region, i.e. upstream or downstream of the evaporator. For this reason, refrigeration installations using the refrigerant carbon dioxide are particularly suitable, since the refrigerant collector is in this case generally located downstream of the evaporator in terms of the refrigerant hydraulic circuit.

According to the invention, it is furthermore possible to provide for the refrigerant collector to be arranged in the stationary air-conditioning circuit or downstream of the thermal accumulator and upstream of the circulation pump or the evaporator.

This minimizes the increase in pressure in the closed stationary air-conditioning circuit, since when the refrigerant is circulating in the stationary air-conditioning circuit a pressure increase occurs in the installation as soon as the liquid refrigerant enters the evaporator and is partially or completely evaporated therein. This increase in volume can lead to an increase in pressure in the installation. It is known that the refrigerant pressure level determines the evaporation temperature, and the higher this pressure level, the higher also is the evaporation temperature.

Furthermore, this position of the refrigerant collector ensures that the circulation pump in the stationary air-conditioning circuit only sucks in 100% liquid refrigerant from the refrigerant collector and therefore operates perfectly, without disruptive noise caused by gas bubbles.

It is advantageous if, in particular in the case of thermal accumulators loaded with refrigeration, the compression refrigeration circuit and the stationary air-conditioning circuit can be operated in parallel.

As a result, with the thermal accumulator laden, it is advantageously possible to achieve high cooling dynamics by simply connecting up the stationary air-conditioning circuit when the compression refrigeration circuit is running.

BRIEF DESCRIPTION OF THE DRAWINGS

Advantageous configurations and refinements of the invention will emerge from the further subclaims and from the exemplary embodiments which are outlined below with reference to the drawing, in which:

FIG. 5*a* shows an outline circuit diagram of a fifth embodiment of the air-conditioning installation according to the invention, using the thermosiphon effect in stationary air-conditioning operation;

DETAILED DESCRIPTION OF THE INVENTION

Figure 1A:
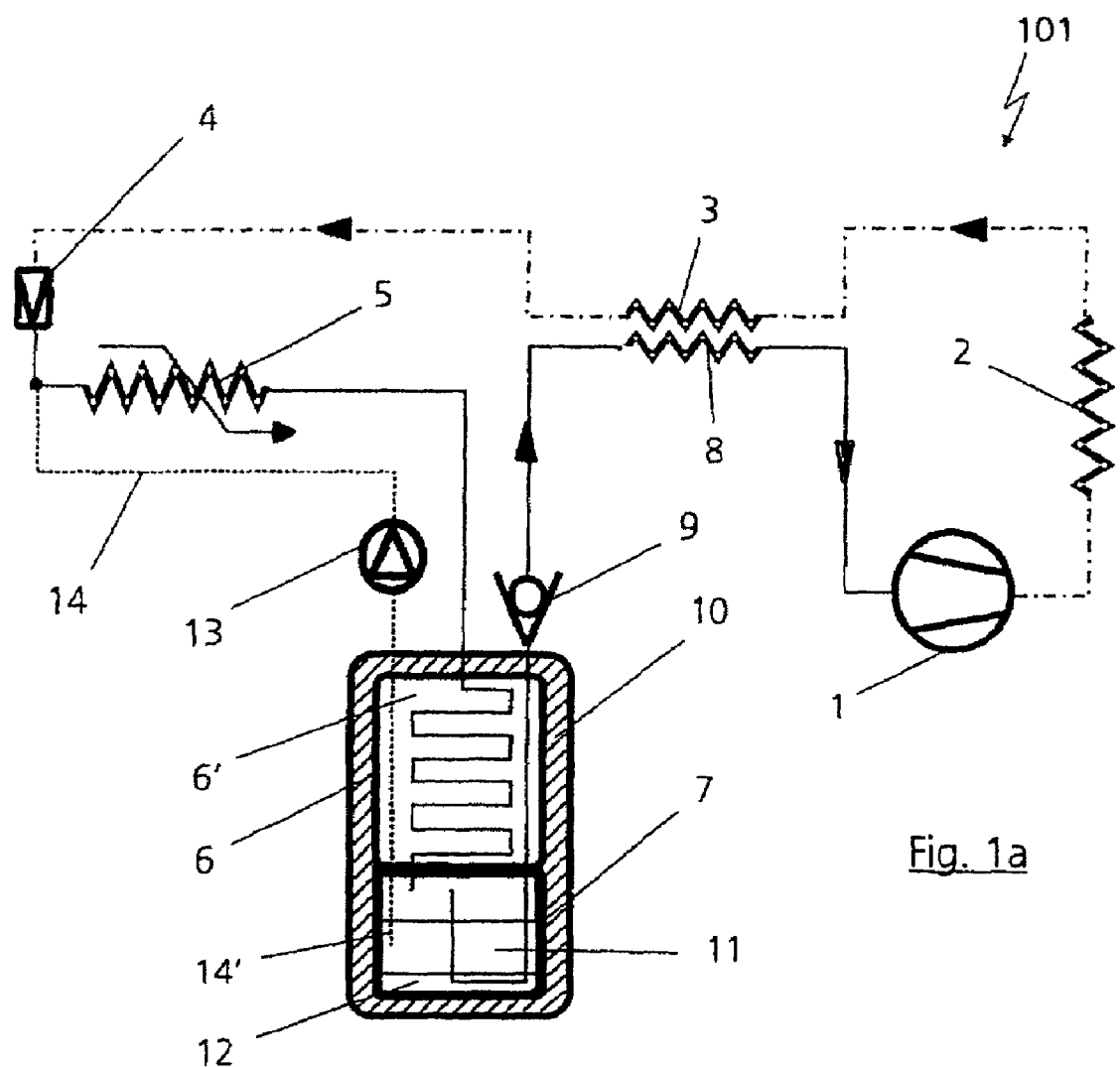
FIG. 1*a* shows an outline circuit diagram for a first embodiment of the air-conditioning installation according to the invention in AC operation.

FIG. 1*a* illustrates an air-conditioning installation, which is denoted overall by reference numeral 101, in AC operation. When the compression circuit is running (high-pressure region indicated by dot-dashed lines and suction region indicated by continuous lines), a refrigerant 11 is brought to a high temperature and pressure level in a compressor 1, is cooled in the ambient heat exchanger 2 before being cooled further via an internal heat exchanger 3. It then passes through an expansion valve 4 and is expanded to a lower pressure and temperature level (10° C. to 0° C., depending on the temperature requirements). In an evaporator 5, the refrigerant 11 takes up energy from the useful air which is passed to the interior (passenger compartment—not shown), cools and dries this air and is in the process partially or completely evaporated before it passes to a thermal accumulator 6. In the present exemplary embodiment, the thermal accumulator 6 is located downstream of the evaporator 5 of the air-conditioning installation 101 in terms of the refrigerant hydraulic circuit. If the refrigerant 11 is colder than the heat storage medium 6' present in the thermal accumulator 6, this medium is laden with refrigeration before the refrigerant 11 passes into a refrigerant collector 7. From the refrigerant collector 7, the refrigerant 11 flows via the low-pressure side of a further internal heat exchanger 8, is in the process superheated before being passed back to the compressor 1.

For reasons of space, the heat storage medium 6' in the thermal accumulator 6 should expediently undergo a phase change between the solid and liquid phase, so that the highest possible volumetric heat storage capacity is achieved. In this case, the introduction and removal of the heat are predominantly latent, i.e. take place at an isothermal level in the form of heat of fusion during the phase change. In the exemplary embodiments, including those described below, the heat storage medium is in the form of a paraffin 6'. Of course, in other exemplary embodiments, it would also be possible, inter alia, to use alcohols or salt hydrates.

In AC operation or when the compression refrigeration circuit is running (FIG. 1*a*), the thermal accumulator 6 is loaded with refrigeration.

Figure 1B:
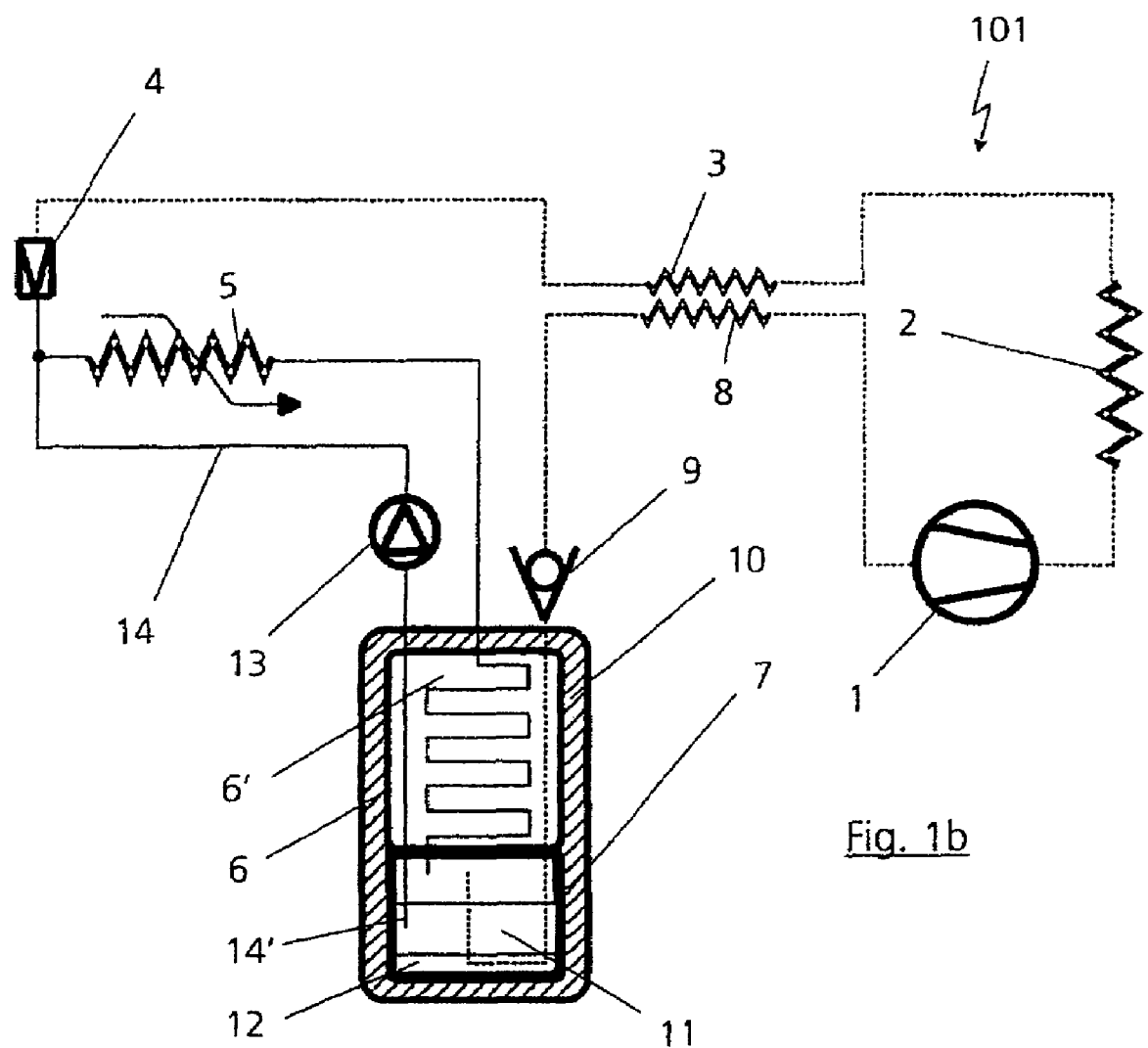
FIG. 1*b* shows an outline circuit diagram of the embodiment according to the invention shown in FIG. 1*a* in stationary air-conditioning operation.

In FIG. 1*b*, the air-conditioning installation 101 is working in stationary air-conditioning operation, i.e. the compression refrigeration circuit has been switched off (dashed lines) while the stationary air-conditioning circuit (solid lines) is active. When the thermal accumulator 6 has been fully loaded with refrigeration, the stationary air-conditioning circuit can also be operated in parallel with the compression refrigeration circuit, in order to achieve better cooling dynamics.

If the compressor 1 is switched off, a nonreturn valve 9 and the closed expansion valve 4 prevent refrigerant 11 from the high-pressure region (illustrated in dashed lines in FIG. 1*b*) from penetrating into the power section of the stationary air-conditioning circuit comprising the evaporator 5 and the refrigerant collector 7, which would allow the refrigerant pressure to rise. The stationary air conditioning now takes place via the stationary air-conditioning circuit, in which, with the aid of a circulation pump 13, liquid refrigerant 11 is passed from the refrigerant collector 7 via a condensate line 14 to the evaporator 5. In the evaporator 5, the refrigerant 11 takes up energy from the useful air, cools and dries this air and is in the process partially or completely evaporated before passing to the thermal accumulator 6. Here, the refrigerant 11 condenses and flows into the refrigerant collector 7, from where the circuit begins again. Accordingly, in the stationary air-conditioning circuit, the thermal accumulator 6 performs the function of a condenser. On account of the poor thermodynamic properties of a lubricant 12 which is present in the refrigerant collector 7 and is required for the compressor 1, the opening 14' of the condensate line 14 should only project into the refrigerant collector 7 to a depth which is such that only liquid refrigerant 11 is sucked in by the circulation pump 13. In this context, it should in particular also be ensured that the refrigerant 11 is in a liquid state, since if a mixture of gaseous and liquid refrigerant 11 is sucked in, not all of the available enthalpy difference of the refrigerant 11 (0 to superheating) is utilized, and noise may be produced in the circuit, on account of gas bubbles being delivered. In the present exemplary embodiment, the refrigerant collector 7 is arranged in the suction region, i.e. upstream or downstream of the evaporator, making the air-conditioning installation 101 described particularly suitable for use with the environmentally friendly refrigerant carbon dioxide, since the refrigerant collector 7 is advantageously located downstream of the evaporator 5 in terms of the refrigerant hydraulic circuit. Accordingly, in the present exemplary embodiments carbon dioxide is also used as refrigerant 11.

Since the condensation and evaporation take place, as it were, isobarically and the refrigerant generally transfers the heat almost exclusively latently, only a low power is required of the circulation pump 13 to maintain the stationary air-conditioning circuit. Thermal insulation 10 of the thermal accumulator 6 and of the refrigerant collector 7 allows the refrigeration energy to be stored for a prolonged period of time and subsequently used for advance air conditioning of the useful air. A further advantage of the thermal insulation 10 is significantly slower evaporation of the liquid refrigerant 11 when the air-conditioning installation 101 is switched off and has been considerably heated. As a result, the refrigerant pressure does not build up as strongly, and a higher refrigeration power and lower refrigerant high pressure are achieved when starting up the air-conditioning installation 101.

Figure 2:
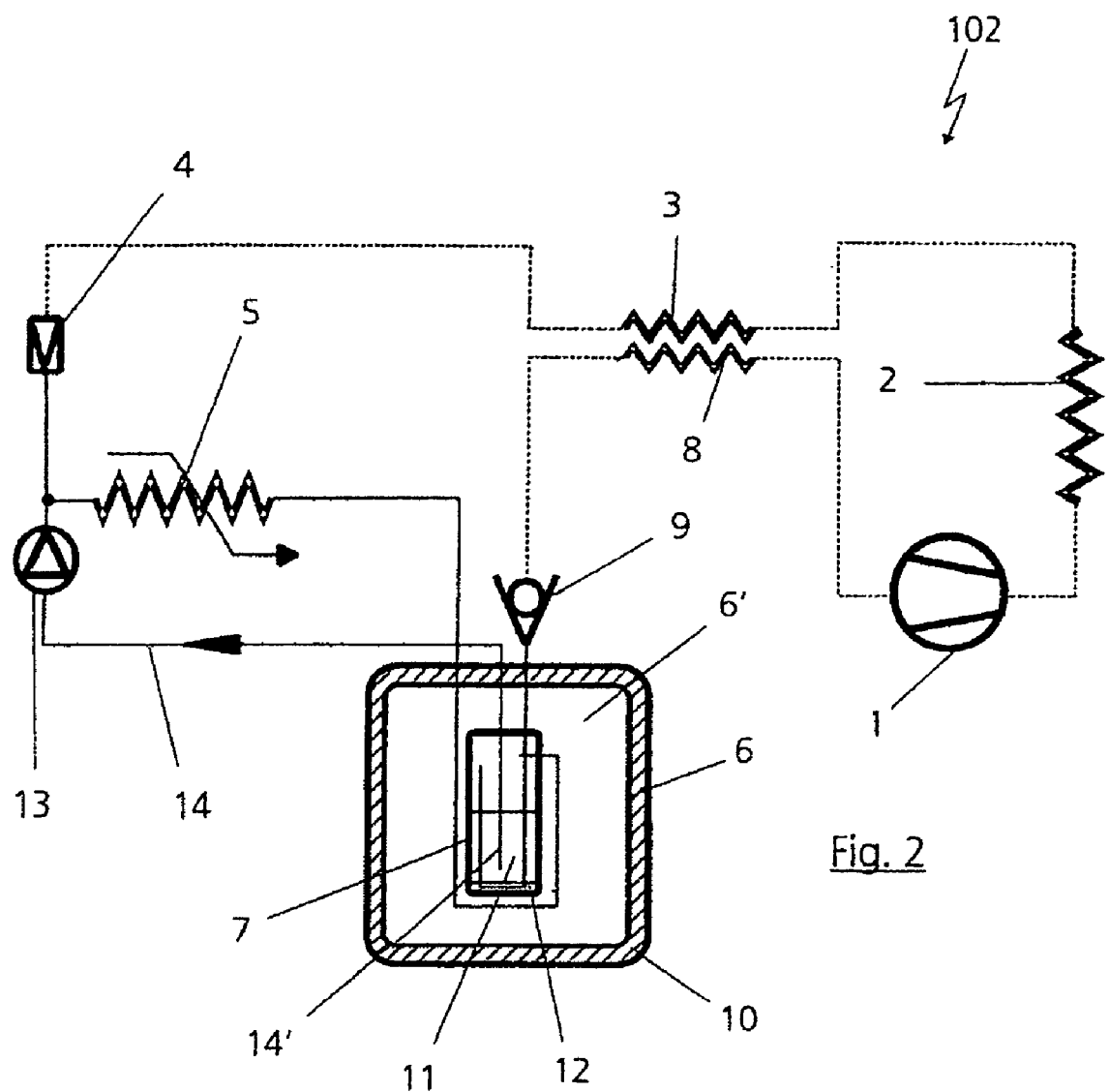
FIG. 2 shows an outline circuit diagram of a second embodiment of the air-conditioning installation according to the invention in stationary air-conditioning operation.

To reduce the number of connection locations and therefore possible leakage sites in the circuit, it is recommended that the thermal accumulator 6 and the refrigerant collector 7 be integrated in accordance with FIGS. 1a, 1b and 2. Furthermore, in another exemplary embodiment it would likewise be conceivable for the circulation pump 13 and/or the nonreturn valve 9 to be accommodated in the thermal accumulator 6 or the refrigerant collector 7, in order to reduce the number of leakage sites.

FIG. 2 shows an air-conditioning installation 102 with a thermal accumulator 6 with a large storage capacity, i.e. a large volume, which surrounds the refrigerant collector 7, which is designed as a pressure vessel, in order to reduce the amount of material needed for the vessel of the refrigerant collector 7.

Figure 3:
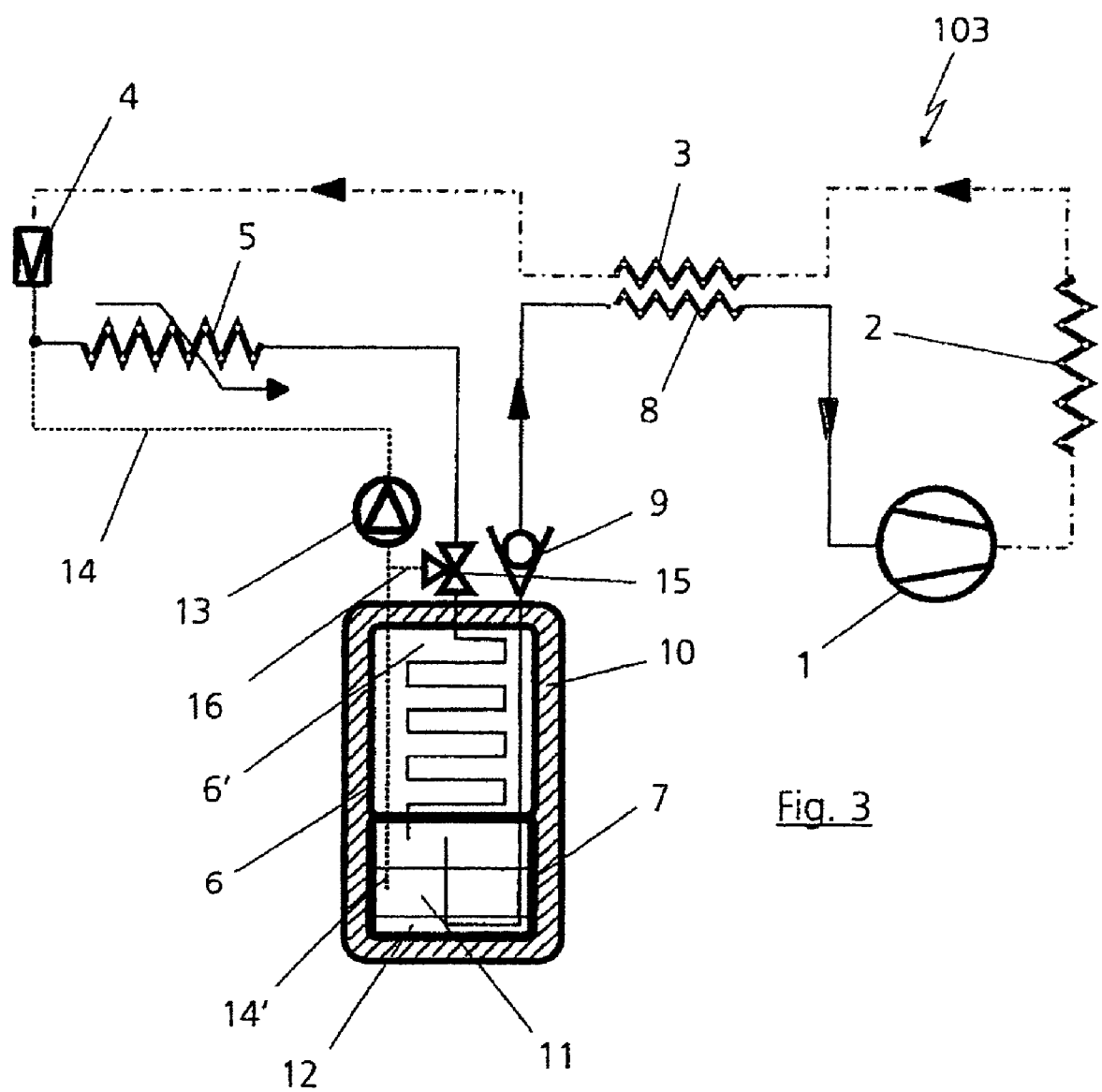
FIG. 3 shows an outline circuit diagram of a third embodiment of the air-conditioning installation according to the invention with bypass in AC operation.

FIG. 3 shows an air-conditioning installation 103 which allows rapid cooling when the interior compartment has heated up. When the thermal accumulator 6 has heated up, i.e. lost its load, it removes part of the refrigeration when the refrigeration installation 103 is being started up, and consequently has an adverse effect on the cooling performance at the evaporator 5. The addition of a bypass valve 15 with a bypass line 16 allows the thermal accumulator 6 to be bypassed if all of the refrigeration capacity is to be transferred to the evaporator 5. The bypass valve 15 may be electrically actuated, as in the present instance, or thermostatically actuated.

Figure 4:
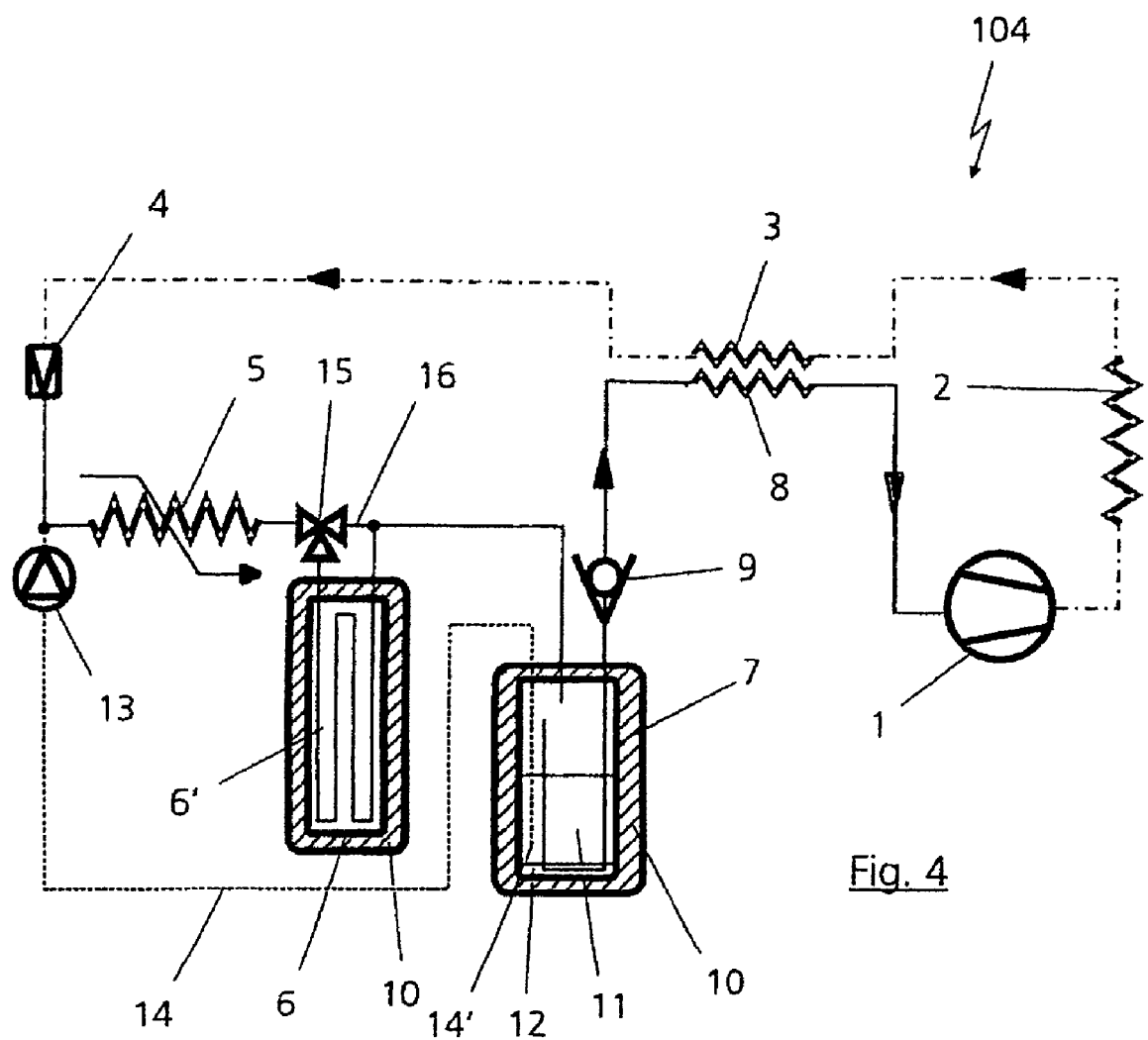
FIG. 4 shows an outline circuit diagram of a fourth embodiment of the air-conditioning installation according to the invention with separately arranged thermal accumulator and refrigerant collector in AC operation.

FIG. 4 illustrates a further air-conditioning installation 104, in which the thermal accumulator 6 is connected spatially separate from the refrigerant collector 7. If the thermal accumulator 6 and refrigerant collector 7 are arranged separately, packaging of the installation is considerably simplified. This results in a space-saving design. Furthermore, the thermal accumulator 6 may also be accommodated at a position which is not critical in thermal terms, e.g. outside the engine compartment, without the refrigerant line of the air-conditioning installation 104 between evaporator 5 and refrigerant collector 7 having to be lengthened unnecessarily.

Figure 5B:
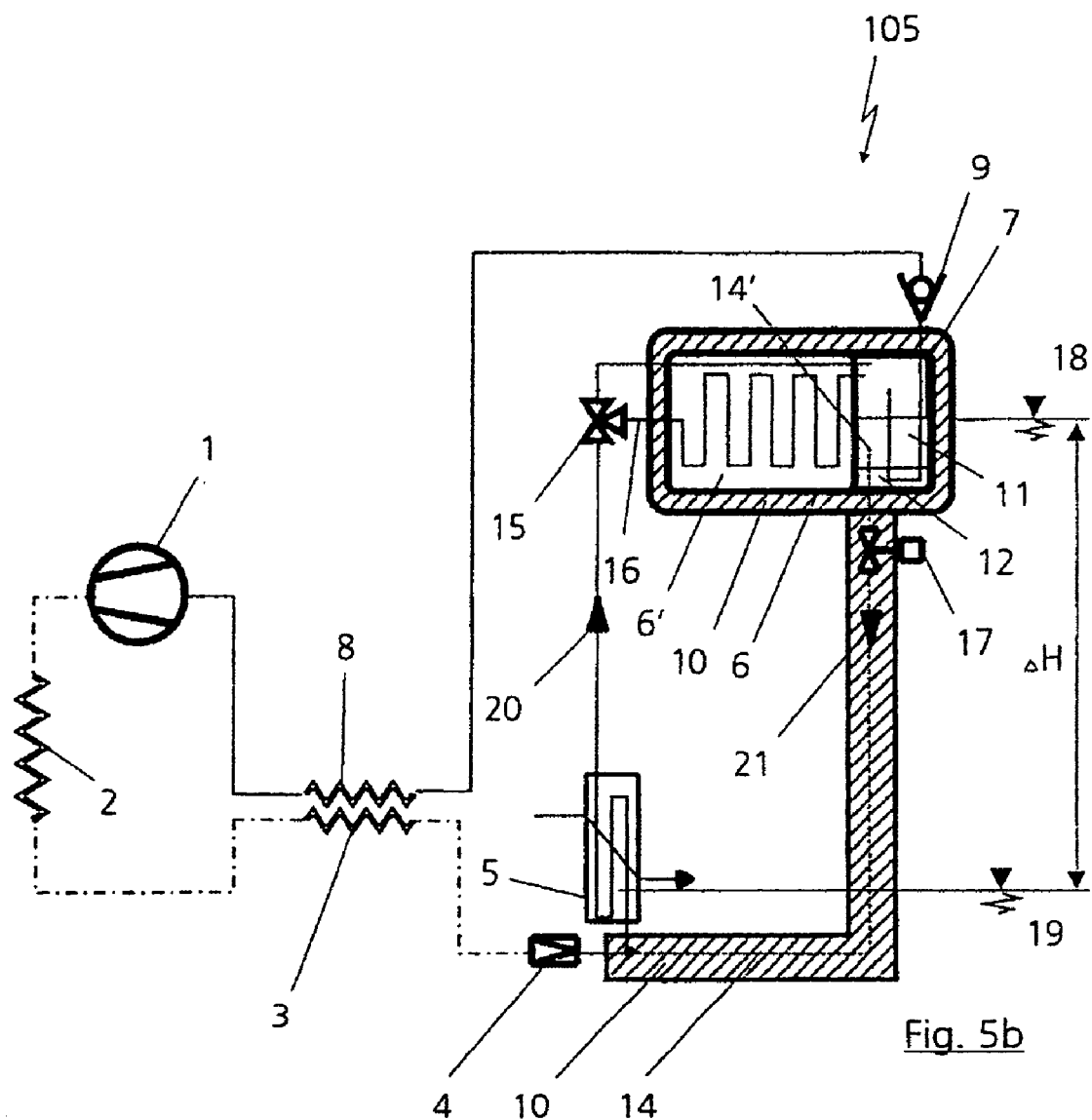
FIG. 5*b* shows an outline circuit diagram of the fifth embodiment according to the invention shown in FIG. 5*a* in AC operation.
Figure 6:
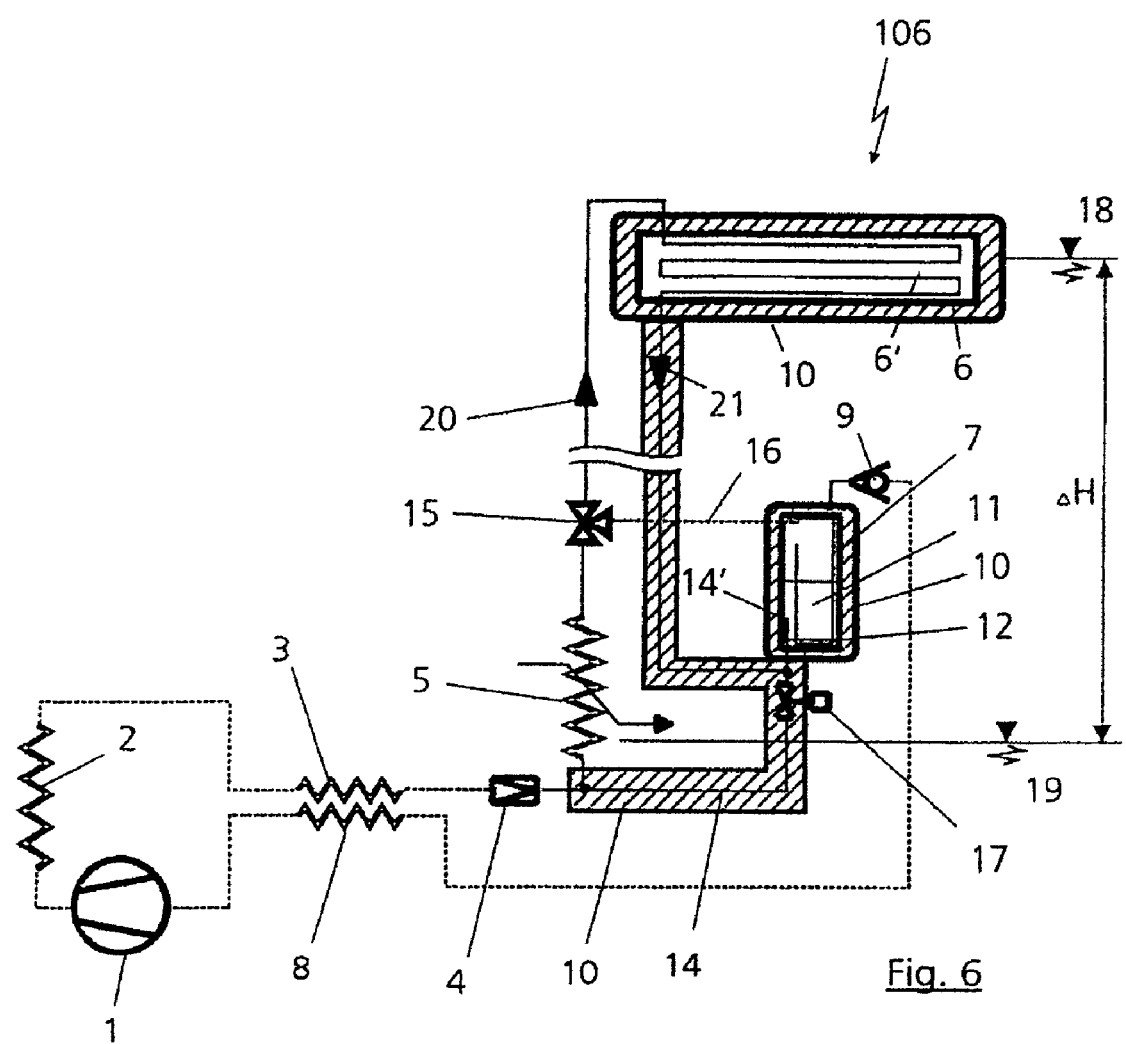
FIG. 6 shows an outline circuit diagram of a sixth embodiment of the air-conditioning installation according to the invention.

FIGS. 5a, 5b and 6 illustrate circuit diagrams 105, 106 in which the stationary air-conditioning circuit works without a refrigerant circulation pump (reference numeral 13 in FIGS. 1a to 4). With a circuit arrangement of this type, the evaporator 5 is located at a geodetically lower level than the thermal accumulator 6, so that during stationary air-conditioning operation (FIG. 5a—compression refrigeration circuit indicated by dashed lines) a gravity-based refrigerant circuit without the use of a circulation pump is formed simply by the thermosiphon effect. The refrigeration capacity which can be taken from the thermal accumulator 6 is substantially determined by the driving pressure gradient, the line resistance in the stationary air-conditioning circuit and by the enthalpy difference of the refrigerant 11. A high driving pressure gradient in the stationary air-conditioning circuit is achieved by using a considerable difference in height between the two condensate levels 18, 19 in the evaporator 5 and thermal accumulator 6 and a considerable difference in density between vapor stream 20 and condensate stream 21 of the refrigerant 11. To achieve the maximum possible enthalpy difference, the evaporator 5 is designed in cross-countercurrent form, since the refrigerant 11 can virtually be superheated up to the temperature level of the air at the evaporator inlet. As can be seen from FIGS. 5a, 5b, 6, the condensate line 14 has in this case likewise been provided with thermal insulation 10. The condensate line 14 is closed by a switching valve 17, which is only open in stationary air-conditioning operation.

In the case of the circuit diagram 106 shown in FIG. 6, the thermal accumulator 6 is arranged separately from the refrigerant collector 7 (cf. FIG. 4), with the result that the thermal accumulator 6 can be arranged spatially well away from the remainder of the refrigeration installation and can be provided with a high heat storage capacity. Arranging thermal accumulator 6 and refrigerant collector 7 separately significantly simplifies the packaging of the refrigeration installation 106. Moreover, the line length of the remaining refrigeration installation between evaporator 5 and refrigerant collector 7 can be kept short, in order thereby to keep the refrigerant pressure losses at a low level.

The circuit connections 105, 106 shown in FIGS. 5a, 5b and 6 are suitable primarily for stationary air-conditioning systems which do not require a high refrigeration power and in which it is possible to realize a considerable difference between the installation heights of evaporator 5 and thermal accumulator 6, so that an adequate gravity circuit is produced. One possible application area for this engine-independent air conditioning would be long-haul commercial vehicles, in which the driver's cab serves as a workplace, accommodation and sleeping space and there are statutory regulations on rest periods for the driver after long journeys. This engine-independent air conditioning could protect the driver from hot and humid ambient conditions. In particular at night, when the demand for refrigeration is not so high on account of the absence of solar radiation, the gravity-based air-conditioning circuit would be suitable for air-conditioning of the driver's cab. If the refrigeration capacity required when stationary is high, the refrigerant condensate stream would have to be boosted by a circulation pump.

Figure 7:
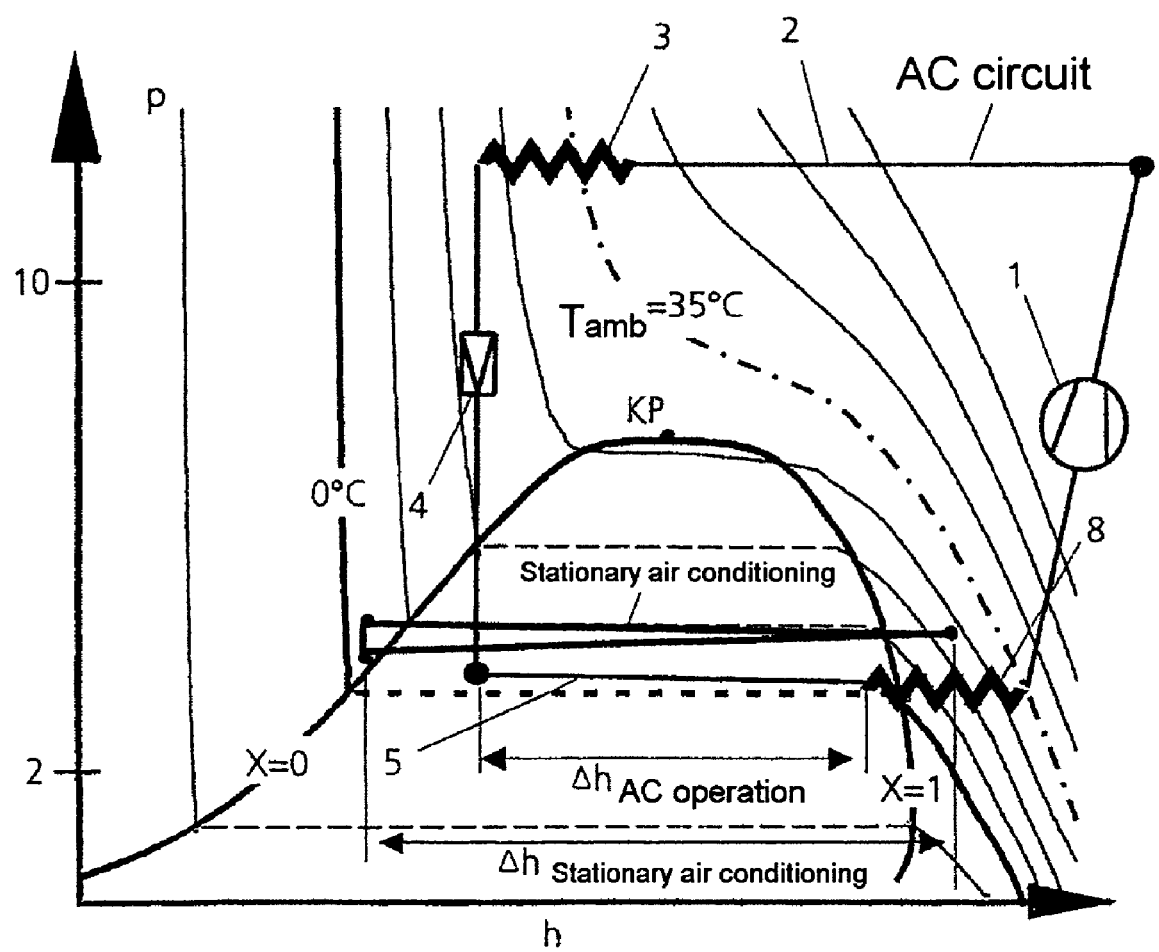
FIG. 7 shows an outline pressure-enthalpy diagram.

The pressure p/enthalpy h diagram illustrated in FIG. 7 shows examples of the states of the refrigerant $CO_2$ in a compression refrigeration circuit (A/C circuit—defined by the reference numerals 1 (compressor), 2 (ambient heat exchanger), 3 (internal heat exchanger), 4 (expansion valve), 5 (evaporator) and 8 (internal heat exchanger)) and a stationary air-conditioning circuit. The diagram illustrates that during stationary cooling the refrigerant undergoes an approximately 50% greater enthalpy change in the evaporator 5 than in A/C operation. It is known that the refrigeration capacity can be calculated from the product of refrigerant mass flow and enthalpy change of the refrigerant, i.e. for the same refrigeration capacity at the evaporator 5, the stationary cooling requires a 50% lower mass flow of refrigerant. This means that the line cross section in the auxiliary circuit (condensate line 14) and the circulation pump 13 can be made correspondingly small.

The invention claimed is:

1. An air-conditioning installation for motor vehicles, having a compression refrigeration circuit of a refrigerant for A/C operation with a high-pressure region, a suction region and a connected stationary air-conditioning circuit, in particular for stationary air-conditioning operation when the compression refrigeration circuit is switched off, at least having:
   a compressor;
   an expansion valve;
   an evaporator as cooler for releasing refrigeration to the environment; and
   a thermal accumulator comprising a heat storage medium, the thermal accumulator serving as a refrigeration accumulator and as a condenser during stationary air-conditioning operation, and the refrigerant which is present as heat transfer medium being used to transfer the refrigeration from the thermal accumulator to the evaporator in the stationary air-conditioning circuit,
   wherein the evaporator (5) and the thermal accumulator (6) are connected in series in terms of the flow of refrigerant,
   wherein a thermally insulated refrigerant collector (7) is provided, and
   wherein during thermal loading and unloading of the thermal accumulator (6) in A/C operation and/or stationary air-conditioning operation, the refrigerant flows through the components in the following order: evaporator (5), thermal accumulator (6) and refrigerant collector (7).

2. The air-conditioning installation as claimed in claim 1, wherein the refrigerant (11) is carbon dioxide ($CO_2$).

3. The air-conditioning installation as claimed in claim 1, wherein the refrigerant (11) is transported from the thermal accumulator (6) or from the refrigerant collector (7) to the evaporator (5) in the stationary air-conditioning circuit by a circulation pump (13) via a condensate line (14).

4. The air-conditioning installation as claimed in claim 1, wherein the refrigerant (11) in the stationary air-conditioning circuit is transported from the thermal accumulator (6) and/or from the refrigerant collector (7) to the evaporator (5) by the thermosiphon effect via a refrigerant condensate line (14), which can preferably be closed by a switching valve (17), the evaporator (5) being arranged at a geodetically lower level than the thermal accumulator (6) and/or the refrigerant collector (7).

5. The air-conditioning installation as claimed in claim 3, wherein the refrigerant accumulator (7) in the stationary air-conditioning circuit and/or on the refrigerant side is arranged downstream of the thermal accumulator (6) and upstream of the circulation pump (13) or the evaporator (5).

6. The air-conditioning installation as claimed in claim 3, wherein the refrigerant collector (7) and/or the thermal accumulator (6) and/or the condensate line (14) are thermally insulated.

7. The air-conditioning installation as claimed in claim 3, wherein the opening (14') of the refrigerant condensate line (14) only projects into the refrigerant collector (17) to a depth such that the circulation pump (13) and/or the thermosiphon effect only sucks in liquid refrigerant (11).

8. The air-conditioning installation as claimed in claim 1, wherein in stationary air-conditioning operation a nonreturn valve (9) prevents refrigerant (11) from penetrating out of the high-pressure region into the power section comprising the evaporator (5) and the refrigerant collector (7).

9. The air-conditioning installation as claimed in claim 8, wherein the circulation pump (13) and/or the nonreturn valve (9) are integrated in the thermal accumulator (6) and/or the refrigerant collector (7).

10. The air-conditioning installation as claimed in claim 1, wherein the thermal accumulator (6) and the refrigerant collector (7) are integrated with one another.

11. The air-conditioning installation as claimed in claim 1, wherein the thermal accumulator (6) surrounds the refrigerant collector (7).

12. The air-conditioning installation as claimed in claim 1, wherein the thermal accumulator (6) and the refrigerant collector (7) are arranged separately.

13. The air-conditioning installation as claimed in claim 1, wherein the thermal accumulator (6) and in particular the loading with refrigeration in A/C operation when the compression refrigeration circuit is running can be bypassed by an electrical or thermodynamic bypass valve (15) with a bypass line (16).

14. The air-conditioning installation as claimed in claim 1, wherein the heat storage medium (6') in the thermal accumulator (6) undergoes a phase change between the solid and liquid phase.

15. The air-conditioning installation as claimed in claim 1, wherein the evaporator (5) is of cross-countercurrent design.

16. The air-conditioning installation as claimed in claim 1, wherein, in particular when the thermal accumulator (6) is laden with refrigeration, the compression refrigeration circuit and the stationary air-conditioning circuit can be operated in parallel.

* * * * *